US012213019B2

United States Patent
Padgett et al.

(10) Patent No.: US 12,213,019 B2
(45) Date of Patent: Jan. 28, 2025

(54) LOCATING CONTENT IN AN ENVIRONMENT

(71) Applicant: APPLE INC., Cupertino, CA (US)

(72) Inventors: David W. Padgett, Sunnyvale, CA (US); Christopher D. Fu, Fremont, CA (US); Scott G. Wade, Santa Clara, CA (US); Paul Ewers, San Francisco, CA (US); Ioana Negoita, San Jose, CA (US); Thomas G. Salter, Foster City, CA (US); Dhruv Aditya Govil, San Mateo, CA (US); Dimitris Ladopoulos, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/511,651

(22) Filed: Nov. 16, 2023

(65) Prior Publication Data

US 2024/0089695 A1 Mar. 14, 2024

Related U.S. Application Data

(63) Continuation of application No. 17/989,226, filed on Nov. 17, 2022, now Pat. No. 11,825,375, which is a (Continued)

(51) Int. Cl.
*H04W 4/02* (2018.01)
*A63F 13/213* (2014.01)
(Continued)

(52) U.S. Cl.
CPC ............ *H04W 4/02* (2013.01); *A63F 13/213* (2014.09); *G02B 27/017* (2013.01); *G06F 3/011* (2013.01);
(Continued)

(58) Field of Classification Search
CPC . G06T 7/70; G06T 2207/30244; G06F 3/011; G06F 3/0482
See application file for complete search history.

(56) References Cited

U.S. PATENT DOCUMENTS 9,240,075 B2 * 1/2016 Mullins .................. G06Q 30/02
9,746,686 B2 8/2017 Haddick
(Continued)

FOREIGN PATENT DOCUMENTS

CN 106372144 A 2/2017

*Primary Examiner* — Gerald Johnson
(74) *Attorney, Agent, or Firm* — Young Basile Hanlon & MacFarlane, P.C.

(57) ABSTRACT

A method includes obtaining an image of a machine-readable data representation that is located on a physical object using a camera of an electronic device. The machine-readable data representation includes an encoded form of a data value. The method further includes decoding the machine-readable data representation to determine the data value, whereby the data value includes a content identifier and a content source identifier. The method also includes selecting a content source based on the content source identifier, obtaining a content item and content location information based on the content identifier from the content source, determining a content position and a content orientation for the content item relative to the physical object based on the content location information, and displaying a representation of the content item using the electronic device according to the content position and the content orientation.

21 Claims, 8 Drawing Sheets

Related U.S. Application Data continuation of application No. 16/861,296, filed on Apr. 29, 2020, now Pat. No. 11,533,580.

(60) Provisional application No. 62/979,478, filed on Feb. 21, 2020, provisional application No. 62/840,510, filed on Apr. 30, 2019.

(51) Int. Cl.

| | | |
|---|---|---|
| *G02B 27/01* | (2006.01) | |
| *G06F 3/01* | (2006.01) | |
| *G06F 3/0482* | (2013.01) | |
| *G06Q 30/02* | (2023.01) | |
| *G06T 19/00* | (2011.01) | |

(52) U.S. Cl.
CPC ........... *G06F 3/0482* (2013.01); *G06Q 30/02* (2013.01); *G06T 19/006* (2013.01)

(56) References Cited

U.S. PATENT DOCUMENTS

| | | |
|---|---|---|
| 9,984,499 B1 | 5/2018 | Jurgenson et al. |
| 10,102,680 B2 | 10/2018 | Jurgenson et al. |
| 10,108,859 B1 | 10/2018 | Suiter et al. |
| 10,127,723 B2 | 11/2018 | Miller |
| 10,203,762 B2 | 2/2019 | Bradski et al. |
| 2011/0078376 A1 | 3/2011 | Deshpande et al. |
| 2015/0054823 A1 | 2/2015 | Dzhurinskiy et al. |
| 2016/0015470 A1 | 1/2016 | Border |
| 2016/0112479 A1 | 4/2016 | Jayaraj et al. |
| 2016/0133230 A1 | 5/2016 | Daniels et al. |
| 2016/0148433 A1 | 5/2016 | Petrovskaya et al. |
| 2016/0171767 A1 | 6/2016 | Anderson |
| 2016/0291922 A1 | 10/2016 | Montgomerie et al. |
| 2017/0243403 A1 | 8/2017 | Daniels et al. |
| 2017/0323486 A1* | 11/2017 | Mullins ................ G06T 11/001 |
| 2017/0337744 A1 | 11/2017 | Martin |
| 2018/0005450 A1 | 1/2018 | Daniels et al. |
| 2018/0053352 A1 | 2/2018 | Finding et al. |
| 2018/0061456 A1* | 3/2018 | Martinez ................ G11B 27/34 |
| 2018/0091869 A1 | 3/2018 | Krishna et al. |
| 2018/0174195 A1 | 6/2018 | Agarwal |
| 2018/0176730 A1 | 6/2018 | Szymczyk et al. |
| 2018/0189840 A1 | 7/2018 | Barnett et al. |
| 2019/0179509 A1 | 6/2019 | Daie et al. |
| 2019/0220775 A1 | 7/2019 | Suzuki et al. |
| 2019/0253254 A1* | 8/2019 | Brownlee .......... G06K 19/0725 |
| 2020/0175764 A1 | 6/2020 | Romea et al. |

* cited by examiner

LOCATING CONTENT IN AN ENVIRONMENT

CROSS REFERENCE TO RELATED APPLICATIONS

This application is a continuation of U.S. patent application Ser. No. 17/989,226, filed on Nov. 17, 2022, which is a continuation of U.S. patent application Ser. No. 16/861,296, filed on Apr. 29, 2020, which claims the benefit of U.S. Provisional Application No. 62/979,478, filed on Feb. 21, 2020, and U.S. Provisional Application No. 62/840,510, filed on Apr. 30, 2019, the contents of which are hereby incorporated by reference in their entireties for all purposes.

TECHNICAL FIELD

The application relates generally to locating content in an environment.

BACKGROUND

In a computer-generated reality (CGR) system, virtual content may be positioned relative to the physical world and displayed to a user such that the content and the physical environment are visible to the user. Typically, approximate positioning techniques are used. As a result, the same content may not be positioned at the same location for each of several different users, the same content may not be positioned at the same location for a single user across multiple sessions, or content may be displayed in a way that lacks geometric correspondence (e.g., accurate alignment) with respect to objects in the physical environment.

SUMMARY

One aspect of the disclosure is a method that includes determining a device location of an electronic device, and obtaining a content item to be output for display by the electronic device based on the device location, wherein the content item comprises coarse content location information and fine content location information. The method also includes determining an anchor in a physical environment based on the content item, determining a content position and a content orientation for the content item relative to the anchor based on the fine content location information, and displaying a representation of the content item using the electronic device using the content position and the content orientation.

In some implementations of the method, obtaining the content item to be output for display by the electronic device is further based on user preference information. In some implementations of the method, obtaining the content item to be output for display by the electronic device comprises transmitting requests to content sources, the requests including the device location and the user preference information. In some implementations of the method, obtaining the content item to be output for display by the electronic device comprises determining that the coarse content location information corresponds to an area defined relative to the device location. In some implementations of the method, obtaining the content item to be output for display by the electronic device comprises ranking the content item based on the user preference information.

In some implementations of the method, the anchor corresponds to a physical feature in the physical environment and determining the anchor in the physical environment includes defining a three-dimensional representation of the physical environment using a sensor that is associated with the electronic device and detecting presence of the physical feature in the three-dimensional representation of the physical environment. The three-dimensional representation of the physical environment may be a three-dimensional point cloud. The three-dimensional representation of the physical environment may be a three-dimensional mesh.

In some implementations of the method, the anchor corresponds to a physical feature in the physical environment and determining the anchor in the physical environment includes obtaining one or more images of the physical environment using a camera that is associated with the electronic device and detecting presence of the physical feature in the one or more images of the physical environment.

In some implementations of the method, the anchor is determined based on wireless signals that are received by the electronic device.

In some implementations of the method, the fine content location information identifies the anchor.

The electronic device may be a handheld device. The electronic device may be a head-mounted device.

In some implementations of the method, the content item includes at least one of a three-dimensional model, an image, a video, audio, executable code, a rendering framework, or metadata that describes the content item. In some implementations of the method, the coarse content location information includes geospatial coordinates. In some implementations of the method, the coarse content location information includes information that describes a position of the content item relative to the electronic device.

In some implementations of the method, the fine content location includes information that describes a relative position and orientation of the content item with respect to the anchor. In some implementations of the method, the fine content location information includes information that defines the anchor. In some implementations of the method, the information that defines the anchor identifies a feature in a two-dimensional image. In some implementations of the method, the information that defines the anchor identifies a feature in a three-dimensional mesh. In some implementations of the method, the fine content location information describes requirements for a suitable surface for placement of the content item.

Another aspect of the disclosure is a system that includes a memory and a processor configured to execute instructions stored in the memory to determine a device location of an electronic device, obtain a content item to be output for display by the electronic device based on the device, wherein the content item comprises coarse content location information and fine content location information, determine an anchor in a physical environment based on the content item, determine a content position and a content orientation for the content item relative to the anchor based on the fine content location information, and display a representation of the content item using the electronic device using the content position and the content orientation.

In some implementations of the system, the processor is further configured to execute instructions stored in the memory to obtain the content item to be output for display by the electronic device by transmitting requests to content sources, the requests include the device location and user preference information, the content item is obtained by determining that the coarse content location information corresponds to an area defined relative to the device location, and the content item is obtained by ranking the content item based on the user preference information.

In some implementations of the system, the anchor corresponds to a physical feature in the physical environment and determining the anchor in the physical environment includes defining a three-dimensional representation of the physical environment using a sensor that is associated with the electronic device and detecting presence of the physical feature in the three-dimensional representation of the physical environment. In some implementations of the system, the anchor corresponds to a physical feature in the physical environment and determining the anchor in the physical environment includes obtaining one or more images of the physical environment using a camera that is associated with the electronic device and detecting presence of the physical feature in the one or more images of the physical environment. In some implementations of the system, the anchor is determined based on wireless signals that are received by the electronic device.

Another aspect of the disclosure is a non-transitory computer-readable storage device including program instructions executable by one or more processors that, when executed, cause the one or more processors to perform operations. The operations include determining a device location of an electronic device, obtaining a content item to be output for display by the electronic device based on the device location, wherein the content item comprises coarse content location information and fine content location information, determining an anchor in a physical environment based on the content item, determining a content position and a content orientation for the content item relative to the anchor based on the fine content location information, and displaying a representation of the content item using the electronic device using the content position and the content orientation.

In some implementations of the non-transitory computer-readable storage device, obtaining the content item to be output for display by the electronic device includes transmitting requests to content sources, the requests include the device location and user preference information, the content item is obtained by determining that the coarse content location information corresponds to an area defined relative to the device location, and the content item is obtained by ranking the content item based on the user preference information.

In some implementations of the non-transitory computer-readable storage device, the anchor corresponds to a physical feature in the physical environment and determining the anchor in the physical environment includes defining a three-dimensional representation of the physical environment using a sensor that is associated with the electronic device and detecting presence of the physical feature in the three-dimensional representation of the physical environment.

In some implementations of the non-transitory computer-readable storage device, the anchor corresponds to a physical feature in the physical environment and determining the anchor in the physical environment includes obtaining one or more images of the physical environment using a camera that is associated with the electronic device and detecting presence of the physical feature in the one or more images of the physical environment.

In some implementations of the non-transitory computer-readable storage device, the anchor is determined based on wireless signals that are received by the electronic device.

Another aspect of the disclosure is a method that includes obtaining an image of a machine-readable data representation using a camera of an electronic device, wherein the machine-readable data representation is located on a physical object and decoding the machine-readable data representation to determine a data value that includes a content identifier. The method also includes obtaining a content item to be output for display by the electronic device based on the content identifier, wherein content location information is associated with the content item. The method also includes determining a content position and a content orientation for the content item relative to the physical object based on the content location information, and displaying a representation of the content item using the electronic device according to the content position and the content orientation.

Some implementations of the method include determining a geometric configuration of the physical object using the electronic device, wherein determining the content position and the content orientation for the content item relative to the physical object is further based on the geometric configuration of the physical object. In some implementations of the method, determining the geometric configuration of the physical object includes analyzing an image of the physical object that is obtained using the camera of the electronic device. In some implementations of the method, determining the geometric configuration of the physical object includes analyzing a three-dimensional sensor output that represents the physical object that is obtained using a three-dimensional sensor of the electronic device. In some implementations of the method, the content item includes a three-dimensional model of the content item and determining the content position and the content orientation for the content item relative to the physical object is further based on matching the three-dimensional model to the geometric configuration of the physical object.

In some implementations of the method, the geometric configuration of the physical object is represented by a three-dimensional point cloud of the physical object. In some implementations of the method, the geometric configuration of the physical object is represented by a three-dimensional mesh of the physical object.

Some implementations of the method include determining a data representation position and data representation pose for the machine-readable data representation, wherein determining the content position and the content orientation for the content item relative to the physical object is further based on the data representation position and the data representation pose for the machine-readable data representation.

In some implementations of the method, obtaining the content item to be output for display by the electronic device includes transmitting a request to a content source. In some implementations of the method, the data value includes a content source identifier that identifies the content source.

In some implementations of the method, the electronic device is a handheld device. In some implementations of the method, the electronic device is a head-mounted device.

In some implementations of the method, the content item includes at least one of a three-dimensional model, an image, a video, audio, executable code, a rendering framework, or metadata that describes the content item.

In some implementations of the method, determining a content position and a content orientation for the content item relative to the physical object based on the content location information includes identifying a feature in a two-dimensional image and determining the content position and the content orientation relative to the feature. In some implementations of the method, the determining a content position and a content orientation for the content item relative to the physical object based on the content location information includes identifying a feature in a three-dimensional mesh and determining the content position and the content orientation relative to the feature.

In some implementations of the method, the machine-readable data representation is a one-dimensional barcode. In some implementations of the method, the machine-readable data representation is a two-dimensional barcode.

Another aspect of the disclosure is a system that includes a memory and a processor. The processor is configured to execute instructions stored in the memory to obtain an image of a machine-readable data representation using a camera of an electronic device, wherein the machine-readable data representation is located on a physical object. The processor is further configured to execute the instructions stored in the memory to decode the machine-readable data representation to determine a data value that includes a content identifier, and obtain a content item to be output for display by the electronic device based on the content identifier, wherein content location information is associated with the content item. The processor is further configured to execute the instructions stored in the memory to determine a content position and a content orientation for the content item relative to the physical object based on the content location information, and display a representation of the content item using the electronic device according to the content position and the content orientation.

In some implementations of the system, the processor is further configured to execute instructions stored in the memory to determine a geometric configuration of the physical object using the electronic device, wherein the content position and the content orientation for the content item relative to the physical object is determined further based on the geometric configuration of the physical object.

In some implementations of the system, the geometric configuration of the physical object is determined by analyzing an image of the physical object that is obtained using the camera of the electronic device.

In some implementations of the system, the geometric configuration of the physical object is determined by analyzing a three-dimensional sensor output that represents the physical object that is obtained using a three-dimensional sensor of the electronic device.

In some implementations of the system, the content item includes a three-dimensional model of the content item and the content position and the content orientation for the content item relative to the physical object is determined further based on matching the three-dimensional model to the geometric configuration of the physical object.

In some implementations of the system, the geometric configuration of the physical object is represented by a three-dimensional point cloud of the physical object. In some implementations of the system, the geometric configuration of the physical object is represented by a three-dimensional mesh of the physical object.

In some implementations of the system, the processor is further configured to execute instructions stored in the memory to determine a data representation position and data representation pose for the machine-readable data representation, wherein the content position and the content orientation for the content item relative to the physical object is determined further based on the data representation position and the data representation pose for the machine-readable data representation.

Another aspect of the disclosure is a non-transitory computer-readable storage device including program instructions executable by one or more processors that, when executed, cause the one or more processors to perform operations. The operations include obtaining an image of a machine-readable data representation using a camera of an electronic device, wherein the machine-readable data representation is located on a physical object and decoding the machine-readable data representation to determine a data value that includes a content identifier. The operations also include obtaining a content item to be output for display by the electronic device based on the content identifier, wherein content location information is associated with the content item. The operations also include determining a content position and a content orientation for the content item relative to the physical object based on the content location information, and displaying a representation of the content item using the electronic device according to the content position and the content orientation.

In some implementations of the non-transitory computer-readable storage device, the operations further include determining a geometric configuration of the physical object using the electronic device, wherein determining the content position and the content orientation for the content item relative to the physical object is further based on the geometric configuration of the physical object.

In some implementations of the non-transitory computer-readable storage device, determining the geometric configuration of the physical object includes analyzing an image of the physical object that is obtained using the camera of the electronic device. In some implementations of the non-transitory computer-readable storage device, determining the geometric configuration of the physical object includes analyzing a three-dimensional sensor output that represents the physical object that is obtained using a three-dimensional sensor of the electronic device.

In some implementations of the non-transitory computer-readable storage device, the content item includes a three-dimensional model of the content item and determining the content position and the content orientation for the content item relative to the physical object is further based on matching the three-dimensional model to the geometric configuration of the physical object.

In some implementations of the non-transitory computer-readable storage device, the geometric configuration of the physical object is represented by a three-dimensional point cloud of the physical object. In some implementations of the non-transitory computer-readable storage device, the geometric configuration of the physical object is represented by a three-dimensional mesh of the physical object.

In some implementations of the non-transitory computer-readable storage device, the operations further include determining a data representation position and data representation pose for the machine-readable data representation, wherein determining the content position and the content orientation for the content item relative to the physical object is further based on the data representation position and the data representation pose for the machine-readable data representation.

Another aspect of the disclosure is a method that includes determining a device location of an electronic device, transmitting a request to a content source, the request including the device location of the electronic device, and receiving, from the content source in response to the request, a content item that is associated with display location information that describes a content position for the content item relative to a physical environment. The content item is selected by the content source based on the content position for the content item being within an area that is defined based on the device location. The method also includes displaying a representation of the content item as part of a computer-generated reality scene in which the representation of the content item is positioned relative to the physical environment according to the content position for the content item from the display location information for the content item.

The device location may be described by geospatial coordinates. The area that is defined based on the device location may be defined by a predetermined radius around the device location. The area that is defined based on the device location may be a room within a building. The display location information for the content item may further include a content orientation for the content item relative to the physical environment, wherein the representation of the content item is positioned in the computer-generated reality scene relative to the physical environment further according to the content orientation for the content item from the display location information. The display location information may describe a physical feature in the physical environment, the content position for the content item may describe a position of the content item relative to the physical feature from the physical environment, and the content orientation for the content item may describe an orientation of the content item relative to the physical feature from the physical environment. The physical feature may be identified in the physical environment by obtaining a sensor output representing the physical environment using a sensor that is associated with the electronic device and detecting presence of the physical feature based on the sensor output.

Another aspect of the disclosure is a method that includes obtaining an image of a machine-readable data representation that is located on a physical object using a camera of an electronic device. The machine-readable data representation includes an encoded form of a data value. The method further includes decoding the machine-readable data representation to determine the data value, whereby the data value includes a content identifier and a content source identifier. The method also includes selecting a content source based on the content source identifier, obtaining a content item and content location information based on the content identifier from the content source, determining a content position and a content orientation for the content item relative to the physical object based on the content location information, and displaying a representation of the content item using the electronic device according to the content position and the content orientation.

Another aspect of the disclosure is a system that includes a memory and a processor. The processor is configured to execute instructions stored in the memory to obtain an image of a machine-readable data representation that is located on a physical object using a camera of an electronic device. The machine-readable data representation includes an encoded form of a data value. The processor is further configured to execute instructions stored in the memory to decode the machine-readable data representation to determine the data value, whereby the data value includes a content identifier and a content source identifier. The processor is also configured to execute instructions stored in the memory to select a content source based on the content source identifier, obtain a content item and content location information based on the content identifier from the content source, determine a content position and a content orientation for the content item relative to the physical object based on the content location information, and display a representation of the content item in a physical environment using the electronic device according to the content position and the content orientation.

Another aspect of the disclosure is a non-transitory computer-readable storage device that includes program instructions executable by one or more processors that, when executed, cause the one or more processors to perform operations. The operations include obtaining an image of a machine-readable data representation that is located on a physical object using a camera of an electronic device. The machine-readable data representation includes an encoded form of a data value. The operations further include decoding the machine-readable data representation to determine the data value, whereby the data value includes a content identifier and a content source identifier. The operations also include selecting a content source based on the content source identifier, obtaining a content item and content location information based on the content identifier from the content source, determining a content position and a content orientation for the content item relative to the physical object based on the content location information, and displaying a representation of the content item in a physical environment using the electronic device according to the content position and the content orientation.

DETAILED DESCRIPTION

The systems and methods that are disclosed herein are directed to identifying content to be displayed in an electronic scene from multiple content sources, and accurately placing the content within the scene across multiple users and sessions. In the systems and methods that are described herein, content can be created using a number of different techniques and can be hosted by a number of different content provider applications. Instead of requiring a user to execute a specific application that is only able to display content that the application is responsible for, a host application is able to connect to multiple content provider applications to identify relevant content and populate a scene with content from the multiple content provider applications simultaneously. A combination of coarse localization techniques and fine localization techniques are used to display content in an accurate positional and rotational relationship relative to the physical environment, which allows existing physical objects to be seamlessly integrated with virtual objects and allows multiple users to experience the same content in the same way (which may occur simultaneously).

Figure 1:
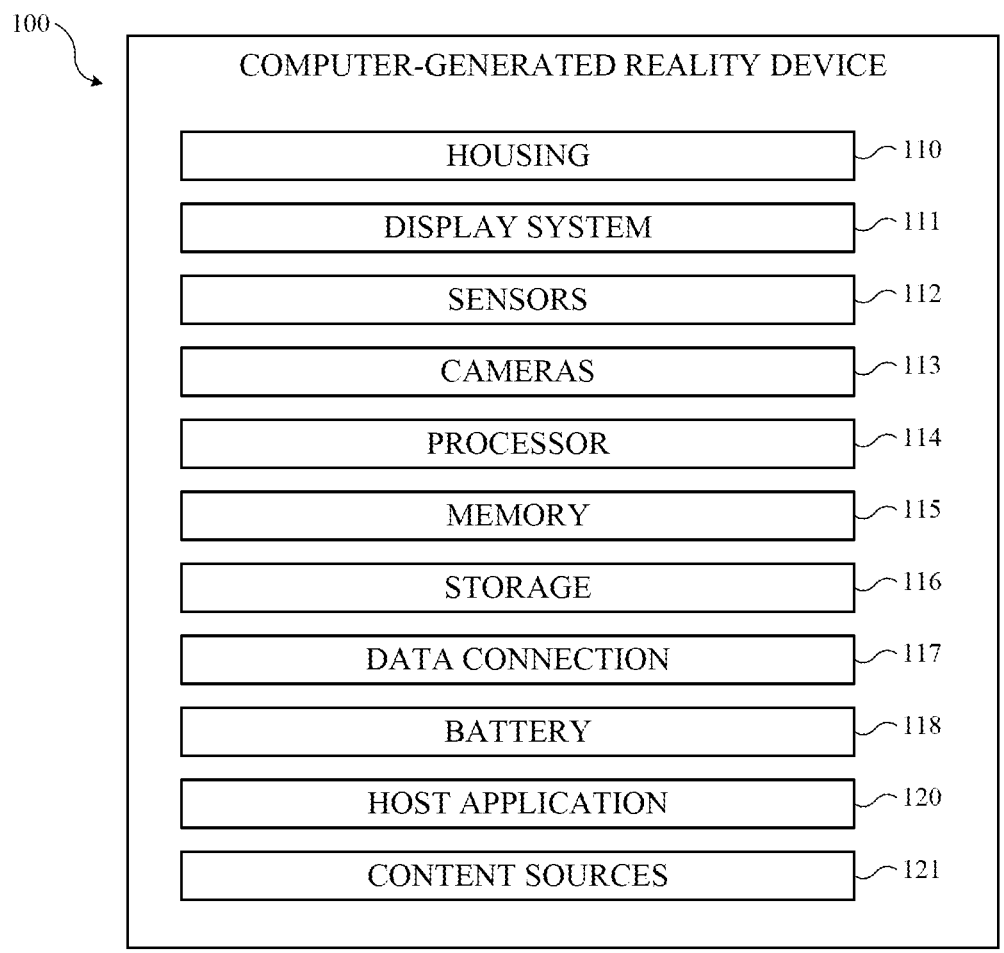
FIG. 1 is a block diagram that shows an example of a computer-generated reality (CGR) device.

FIG. 1 is a block diagram that shows an example of a computer-generated reality (CGR) device 100. The CGR device 100 is an electronic device that may include a housing 110, a display system 111, sensors 112, cameras 113, a processor 114, a memory 115, storage 116, a data connection 117, and a battery 118. As examples, the CGR device 100 may be implemented in the form of a smartphone, a smart watch, a tablet computer, or a head-mounted display device.

The housing 110 is the physical structure that other components of the CGR device 100 are connected to and supported by. Various configurations and materials can be used for the housing 110. In some implementations, the CGR device 100 is a handheld device, and the housing 110 is a handheld structure or a structure that is worn on the user's arm or wrist. Examples of devices that use this type of configuration are smart phones and smart watches. In some implementations, the CGR device 100 is a head-mounted device, and the housing 110 is configured such that it may be worn on the user's head. When the configured to be head-mounted, the housing 110 may include a headband or other securing structure in conventional configurations such as a goggles-type configuration, a halo-type configuration, or a mohawk-type configuration.

The display system 111 includes a device that is operable to output images, such as still images or video images, and optical elements that present the images to the user. As examples, the display system 111 may include an LCD display panel, an LED display panel, or an OLED display panel to output images. In implementations in which the CGR device 100 is a handheld device, further optical elements are not required. In implementations in which the CGR device 100 is a head-mounted device, an optical pass-through CGR configuration may be defined using an optical combiner that allows virtual content to appear to be overlaid over a direct view of the surround environment. In implementations in the which the CGR device 100 is a head-mounted device, a video pass-through CGR configuration may be utilized, in which the images displayed to the user synthesize captured (e.g., by a camera) images with virtual content, using lenses that display content individually to each of the user's eyes.

The sensors 112 are devices that are incorporated in the CGR device 100, such as by being located inside the housing 110 or by being permanently connected to the housing 110. The sensors 112 are able to output signals that represent a sensed condition. Examples of individual sensors that can be incorporated in the sensors 112 include an inertial measuring unit that utilizes accelerometers, gyroscopes, and magnetometers to output information that describes motion, visible spectrum cameras, infrared spectrum cameras, structured-light stereo devices, depth cameras, lidar devices, radar devices, ultrasonic devices, infrared detectors that measure signals from external infrared sources, infrared beacons that emit signals that can be measured by external infrared detectors, biometric sensors, capacitance sensors, temperature sensors, light sensors, and force sensors.

The cameras 113 include one or more visible spectrum cameras and/or infrared cameras that are operable to capture images (e.g., video frames that each include an array of pixels) of the environment around the CGR device 100. The CGR device 100 may be a video pass-through CGR device, that utilizes the images that are obtained by the cameras to generate the content that is displayed to the user of the CGR device 100 using the display system 111. For example, the cameras 113 may obtain images, add elements to the images to define augmented images, and output the augmented images using the display system 111 of the CGR device 100.

The processor 114 is incorporated in the CGR device 100, such as by location in the housing 110. The processor 114 is operable to execute computer program instructions and perform operations described by the computer program instructions. As an example, the processor 114 may be a conventional device such as a central processing unit. The memory 115 may be a volatile, high-speed, short-term information storage device such as a random-access memory module. The storage 116 may be a non-volatile information storage device such as a flash memory module, a hard drive, or a solid-state drive. The processor 114, the memory 115, and the storage 116 are electrically connected (e.g., by a system bus) to allow for high-speed transfer of data between them.

The data connection 117 is communications connection that allows information to be exchanged between the CGR device 100 and other computing devices. The data connection 117 may also be used by the CGR device 100 to obtain any Internet-accessible information when connected to a suitable source of connectivity with the Internet. The data connection 117 may be a wired connection or a wireless connection using any suitable communications protocol.

As an example, the data connection 117 may be implemented as a wireless local area network (WLAN). In one implementation, a WLAN may be implemented using a wireless data communication standard from the Institute of Electrical and Electronics Engineers (IEEE) 802.11 family of standards (i.e., Wi-Fi), such as the 802.11ac standard, the 802.11ad standard, or the 802.11ax standard. As another example, the data connection 117 may be implemented as a wireless personal area network (WPAN). In one implementation, a WPAN may be implemented using the Bluetooth® wireless data communication standards published by the Bluetooth® Special Interest Group.

The battery 118 is incorporated in the CGR device 100 to allow operation of the CGR device 100 without a wired power-transmitting connection to a power supply. As one alternative, a wired power supply can be used. As another alternative, wireless power transmission can be used.

As will be explained in detail herein, the CGR device 100 includes a host application 120 and one or more content sources 121. The host application 120 causes content to be displayed to the user. The content sources 121 are applications or services that provide access to content items that are stored on the CGR device 100 or provide access to content items that are stored remotely (e.g., accessible using a communications network such as the Internet). As one example, the host application 120 and the content sources 121 may be stored in the storage 116 and loaded into the memory 115 as needed, so the host application 120 can be executed by the processor 114 to control aspects of the operation of the CGR device 100 using content items that are provided by the content sources 121. As another example, the host application 120 may be stored in the storage 116 and loaded into the memory 115 as needed, so that the host application 120 can be executed by the processor 114 to control aspects of the operation of the CGR device 100 using content items that are provided by the content sources 121, and the content sources 121 may be at a remote location relative to the CGR device 100 (e.g., a physically separate device that is network accessible).

Figure 2:
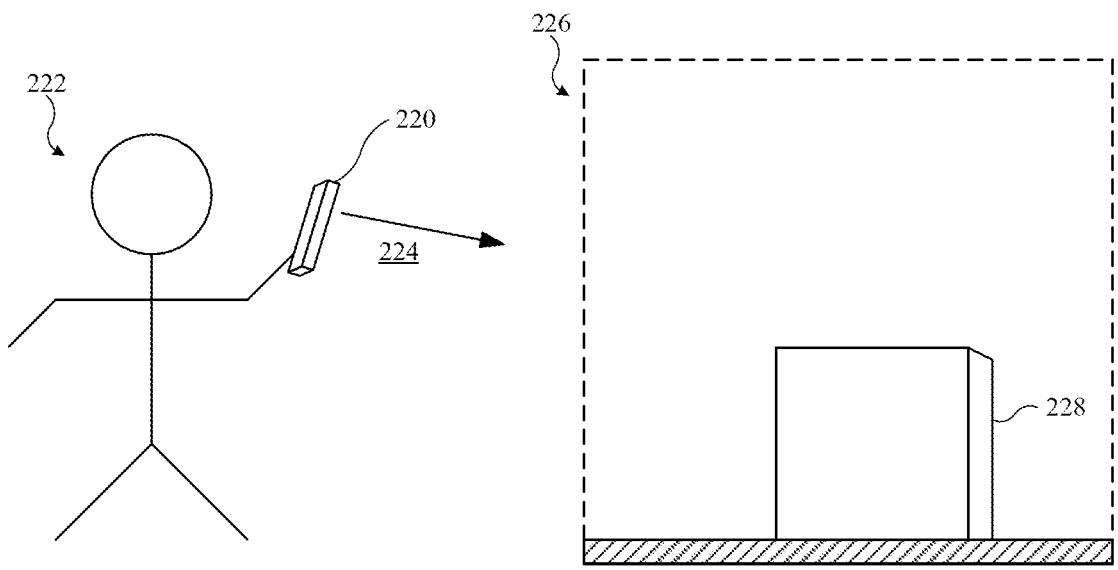
FIG. 2 is an illustration that shows a hand-held CGR device and a physical environment.
Figure 3:
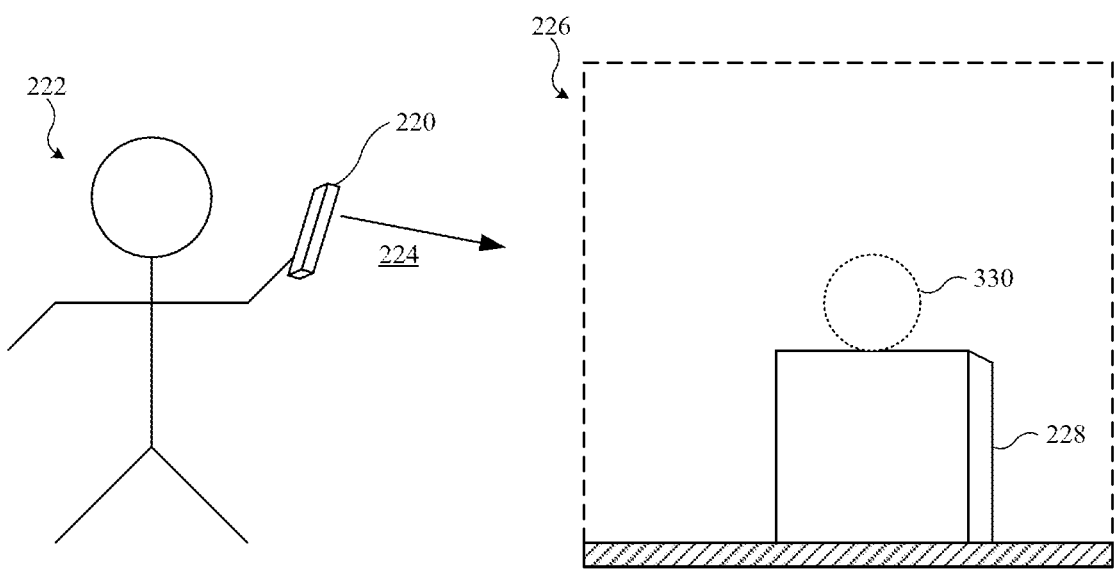
FIG. 3 is an illustration that shows the hand-held CGR device, the physical environment, and a virtual object.

FIG. 2 is an illustration that shows a handheld CGR device 220 and a physical environment 226. FIG. 3 is an illustration that shows the handheld CGR device 220, the physical environment 226, and a virtual object 330 that is displayed at a specific position and pose relative to the physical environment.

The handheld CGR device 220 is an implementation of the CGR device 100 and may include any or all of the components described with respect to the CGR device 100. In this example, the handheld CGR device 220 is an electronic device that has a form factor that allows it to be held by a user 222. As examples of form factors, the handheld CGR device 220 may be implemented in the form of a smart phone, a tablet computer, or a smart watch.

In the illustrated example, the user 222 is holding the handheld CGR device 220 such that a view direction 224 is oriented toward a physical environment 226, which in the illustrated environment includes a physical object 228 that has physical features, such as a surface and edges. The handheld CGR device 220 is able to obtain information regarding the physical object 228, such as information describing the surfaces and edges of the physical object 228. This information is used by the handheld CGR device 220 to display the virtual object 330 so that the virtual object 330 appears to be part of the physical environment 226.

As shown in FIG. 3, the handheld CGR device 220 displays a virtual object 330 to the user such that the virtual object 330 is positioned at a particular location and orientation within the physical environment 226, such as at a particular location and orientation referenced relative to the physical object 228.

The virtual object 330 is a representation of a content item that is displayed in the scene that is viewed by the user. The virtual object 330 may be, as examples, a three-dimensional object or a two-dimensional object (e.g., an image or text). The virtual object 330 may be a static virtual object, such as a virtual statue, or may be a dynamic virtual object, such as a virtual animated character. In some implementations, the user may interact with the virtual object 330, in accordance with to computer program instructions that are included in the content item and control the behavior of the virtual object 330.

The scenario shown in FIGS. 2-3 may be implemented using a head-mounted CGR device, which may also be referred to as a head-mounted display. The head-mounted CGR device is an implementation of the CGR device 100 and may include any or all of the components described with respect to the CGR device 100. In this example, the head-mounted CGR device is an electronic device that has a form factor that allows it to be worn on the head of a user. The head-mounted CGR device may utilize known configurations and may be implemented in the form of a video pass-through CGR device or may be implemented in the form of an optical pass-through CGR device. The user controls the orientation of a view direction of the head-mounted CGR device by the position and angular orientation of their head, and optionally based on the gaze angle of their eyes, in implementations in which the head-mounted CGR device has eye-tracking capabilities.

As shown and described with respect to the handheld CGR device 220, the head-mounted CGR device may be oriented such that the view direction is oriented toward a physical environment that includes a physical object, as described with respect to the physical environment 226 and the physical object 228. The head-mounted CGR device displays a virtual object to the user such that the virtual object is positioned at a particular location and orientation within the physical environment, such as at a particular location and orientation referenced relative to the physical object.

The virtual object is a representation of a content item that is displayed in the scene that is viewed by the user. The virtual object may be, as examples, a three-dimensional object or a two-dimensional object (e.g., an image or text). The virtual object may be a static virtual object, such as a virtual statue, or may be a dynamic virtual object, such as a virtual animated character. In some implementations, the user may interact with the virtual object, in accordance with computer program instructions that are included in the content item and control the behavior of the virtual object.

Figure 4:
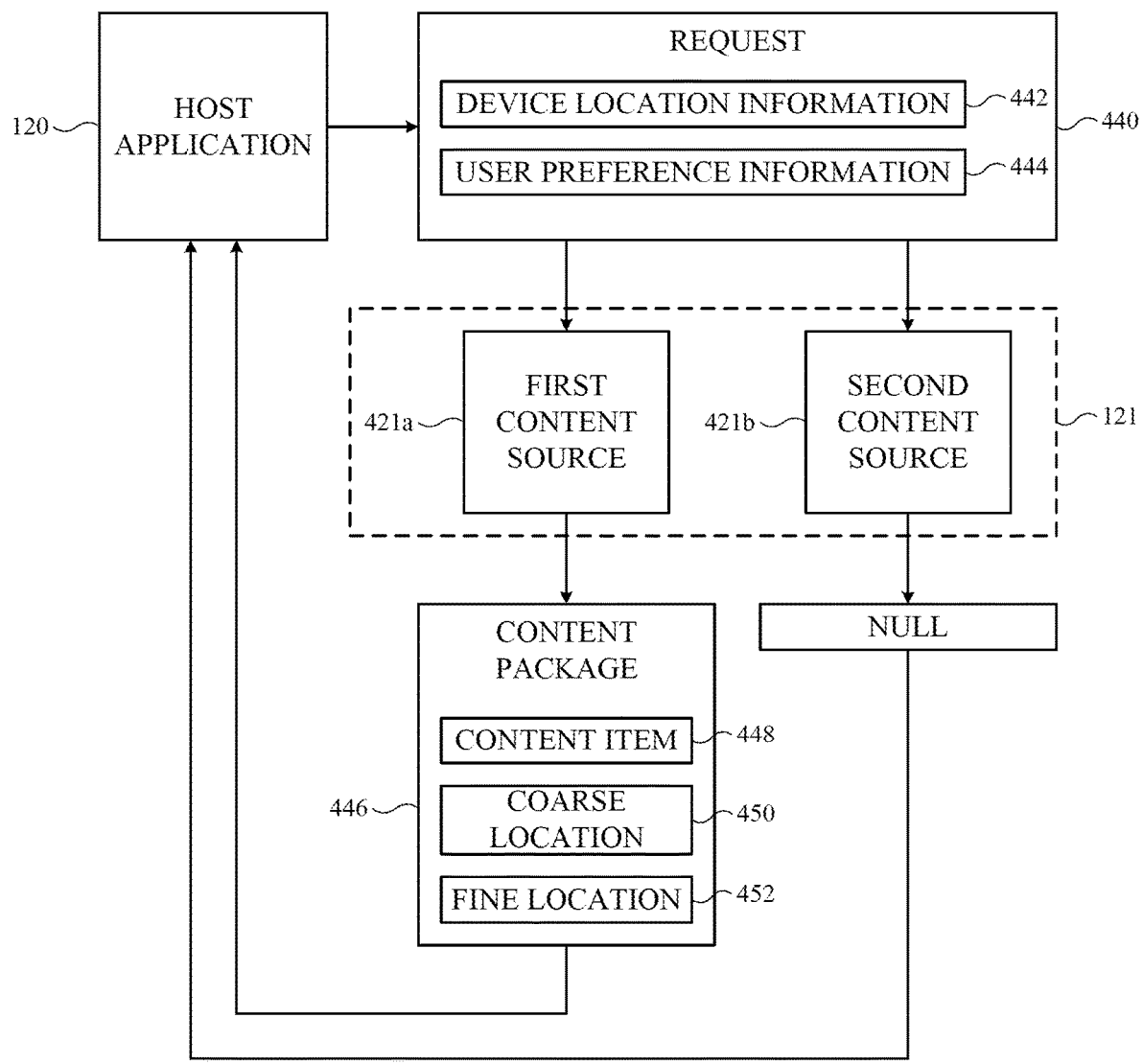
FIG. 4 is a block diagram that shows an example of a relationship between a host application and a content provider according to a first implementation.

FIG. 4 is a block diagram that shows an example of a relationship between the host application 120 and the content sources 121 according to a first implementation. The host application 120 sends a request 440 to each of the first content source 421a and a second content source 421b. The request 440 from the host application asks the content sources to identify content that could be output for display to the user. In the illustrated example, the request is sent to two content sources, but the request 440 could instead be sent to many content sources (e.g., dozens of content sources). The content sources 121 may include local content sources (e.g., in the form of applications that are executed by the CGR device 100, in which case the request 440 may be made in the form of a local API call). The content sources 121 may include remote content sources that are not located on the CGR device 100 (e.g., content sources implemented by remote services that are accessible using a communications network such as the Internet), in which case the request 440 may be transmitted to the remote content sources using any suitable means of communication.

The request 440 includes information that allows the content sources to identify content that is relevant to the user at the time at which the request is sent. In the illustrated example, the request 440 can include device location information 442 and user preference information 444. Other types of information could be included in the request 440.

The device location information 442 may include location of any type that allows for a coarse understanding of the location of the user. As one example, the device location information 442 can include geospatial coordinates determined using a satellite navigation system (e.g., a global navigation satellite system (GNSS)). As another example, the device location information 442 can identify a signal (e.g., from a wireless network node or a locating beacon) that has been received by the CGR device 100 and which provides a basis for understanding the location of the user. As another example, the device location information 442 may describe a computer interpretable feature such as a machine-readable code (e.g., a QR code) that was identified using a sensor of the CGR device 100 and can be correlated with a geospatial location (e.g., correlated using information stored in a database). As another example, the device location information 442 may describe a landmark that was visible in an image obtained by the CGR device 100 and interpreted using a machine vision system, where the landmark can be correlated with a geospatial location (e.g., correlated using information stored in a database). In one implementation, the CGR device obtains images showing objects that, together, can be identified as objects previously observed in a known location, such as the user's home, and based on observation of these objects can include known geospatial coordinates or other identifying information in the device location information 442. The foregoing examples are not exhaustive, and other sensing modalities can be used to determine and describe the coarse location of the user in the device location information 442. In addition, multiple sensing modalities can be used simultaneously to provide the best information as to device location under current conditions.

The device location information 442 can be used by the content sources 121, such as the first content source 421*a* and the second content source 421*b*, to include and exclude content items that may be delivered to the CGR device 100 and displayed to the user. As an example, the device location information 442 can be used to define an area (e.g., a geospatial area, a room in a building, or other subdivision of physical space). As one example, the area could be a radius of a certain length that is used to define an area around the device location, as indicated by the device location information 442. The content sources 121 can identify content items that are within the area and can identifying content items that are outside of the area, where content items that are located inside the area can be considered for delivery to the CGR device 100 to be displayed to the user, and content items that are outside of the area are not considered for delivery to the CGR device 100 to be displayed to the user.

The user preference information 444 can describe the types of content that the user wishes to see and can describe the types of content that the user does not wish to see. The user preference information 444 can, for example, indicate preferences for content using filters, categories, or by inclusion or exclusion of specific content items. The user preference information 444 can include multiple qualitative or quantitative factors that can be used to rank content. For example, the content sources can use the factors or other information included in the user preference information to rank various content items that are located near the user's location (e.g., as determined based on the device location information 442).

The content sources 121 receive the request 440 and attempt to identify content items for delivery to the host application 120 using the device location information 442, the user preference information 444, and/or other information that is included in the request 440. Upon identifying the content items, the content sources 121 may transmit information regarding the content items to the host application 120. In the illustrated example, the first content source 421*a* has identified content to be output for display by the CGR device 100 and transmits a content package 446 to the host application 120.

The content package 446 may include, for example, a content item 448, coarse content location information 450, and fine content location information 452. The content item 448 includes static and interactive content that will be output for display to the user and/or available for interaction (e.g., by performing an action in response to a user action). The content item 448 may include, as example, three-dimensional models, images, videos, audio, executable code that affects behavior of the content item 448 to allow interactivity, a rendering framework for facilitating rendering and display of the content item 448, and/or metadata that describes aspects of the other components that are included in the content item 448.

In some implementations, the content item 448 is a dynamic object that is generated by one of the content sources 121. For example, one of the content sources 121 may provide access to a library of individual content items, such as books, magazines, articles, songs, movies, video games, or photographs. The content item 448 that is output for display by the CGR device 100 may, in this example, be a depiction (e.g., in the form of a three-dimensional model or a group of three-dimensional models) of the library of content items, such as virtual representations of books arranged side by side that can be positioned on a physical bookshelf in the physical environment or on a virtual bookshelf that is positioned on a floor, wall, or other physical structure in the physical environment.

The coarse content location information 450 includes information that provides a sufficient basis for determining that the CGR device 100 is located near the intended location of the content item 448. The coarse content location information 450 may also provide a sufficient basis for determining whether the intended location of the content item 448 is within or near a current field of view of the CGR device 100. As an example, the coarse content location information may include geospatial coordinates or other information indicating a relative position of the content item 448 relative to the CGR device 100.

The fine content location information 452 allows the content item 448 to be output for display to the user in dependence on the current position and orientation of the CGR device 100 such that the content item 448 is placed with a high degree of accuracy and precision relative to the physical environment and physical objects in the physical environment. As one example, the fine content location information 452 may identify or define an anchor, and the CGR device 100 can use this information to match the anchor that is identified by the fine content location information 452 to a location in the physical environment. In some implementations, a single anchor is used to locate the content item 448 with respect to the physical environment. In other implementations, multiple anchors are used to locate the content item 448 with respect to the physical environment.

The anchor may be a feature in the physical environment that is discernable by the CGR device 100. As examples, the anchor may be an edge, corner, outline, or contour of a physical object. As one example, the edge, corner, outline, or contour of the physical object may be discerned by using machine vision techniques to analyze visible spectrum images that are captured by cameras that are included in or associated with the CGR device 100. As one example, the feature may be defined by information that allows the feature to be identified in a two-dimensional image. As another example, the feature may be defined by information that allows the feature to be identified in a three-dimensional mesh or point cloud. For example, the edge, corner, outline, or contour of the physical object may be discerned by analyzing three-dimensional geometric data (e.g., point clouds) that represent surfaces of the physical object. The three-dimensional geometric data may be captured using sensor that are associated with the CGR device 100, such as structured light sensors, depth cameras, or LIDAR sensors.

The anchor may be a wireless positioning signal. A wireless positioning signal may be implemented using radio frequency communication technologies and may be implemented using signal triangulation techniques. Devices such as radio frequency beacons and wireless networking signals may be used as signal sources for triangulation.

The fine content location information 452 may indicate a specific anchor or may define how the content item 448 can connect to many different general anchors at different locations. A specific anchor defines a one-to-one positional correspondence between the content item 448 and the physical world. As an example, a specific anchor may position content onto the surface of a specific artifact at a specific museum. In this example, multiple specific anchors may be used to localize the content item 448 with respect to the surface.

A general anchor is a location referenced with respect to a physical object that can be used as a basis for positioning many different types of content items. As an example, an anchor can be defined with respect to a physical environment such that the anchor is positioned at a certain location on a surface, such as in the center of a table top. In this example, the fine content location information may define a part of the model (or other representation) for the content item 448 that snaps to an anchor when positioned relative to the physical environment in a scene that is output for display to the user by the CGR device 100.

Using the coarse content location information 450, the host application 120 may determine that the content item 448 should be displayed within the current field of view of the CGR device 100. For example, the host application may determine that the coarse content location information 450 corresponds to a location that is within the current field of view of the CGR device 100. Using the fine content location information 452, the host application 120 attempts to place the content item 448 with respect to the physical environment and physical objects within it. Upon determining the position of the content item 448 with respect to the physical environment and the physical objects in it to within a desired degree of accuracy, the host application 120 may cause the content item 448 to be output for display to the user and may implement interactivity or other functions according to computer interpretable program instructions that are included in the content package 446.

Figure 5:
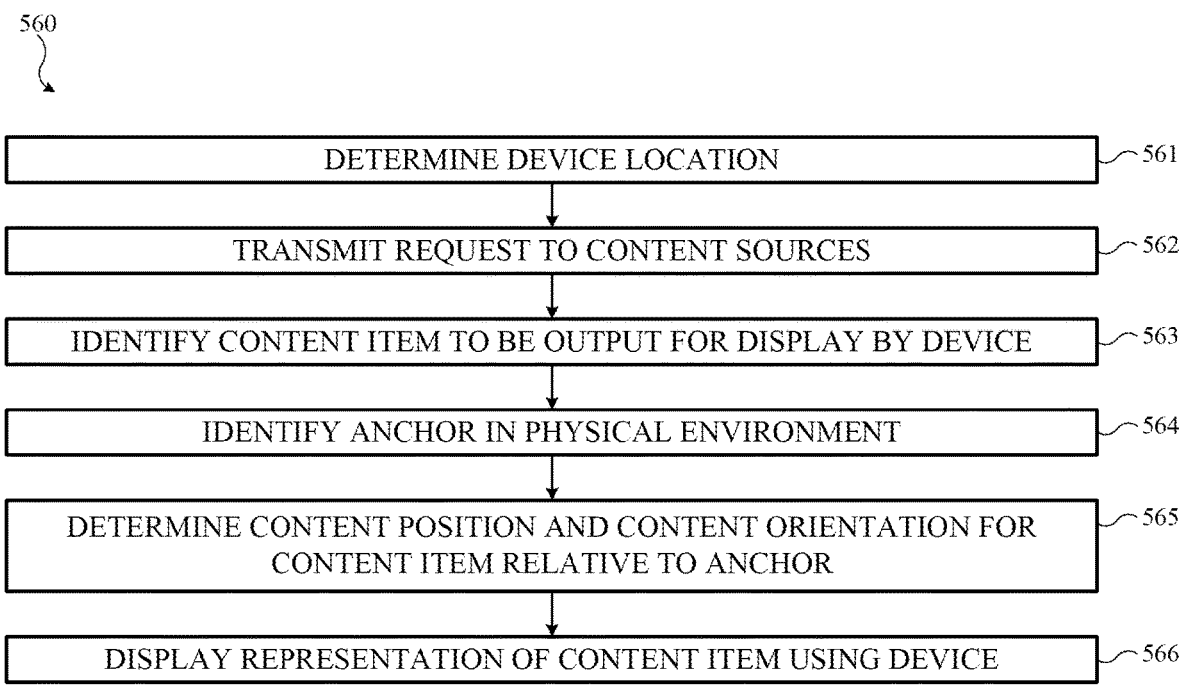
FIG. 5 is a flowchart that shows a process for content identification and placement according to the first implementation.

FIG. 5 is a flowchart that shows a process 560 for content identification and placement. The process 560 allows a host device to access content from multiple content sources using a host application. Portions of the process 560 can be implemented as computer program instructions, such as the host application 120, and these computer program instructions can be executed by a processor, such as the processor 114 of the CGR device 100. The process 560 will be described with reference to the CGR device 100, the host application 120, and the content sources 121, but can be used with other devices, applications, and content sources. The process 560 may be implemented using a handheld device, such as the handheld CGR device 220, a head-mounted device, such as the head-mounted CGR device, or a device having a different form factor.

As one example, the process 560 can be implemented in the form of a system that includes a memory and a processor that is configured to execute instructions stored in the memory, where the instructions correspond to the process 560. As another example, the process 560 can be implemented in the form of a non-transitory computer-readable storage device including program instructions executable by one or more processors. The program instructions correspond to the process 560 and, when executed, cause the one or more processors to perform operations of the process 560.

In operation 561, the host application 120 determines the device location of an electronic device, such as the CGR device 100. The location of the CGR device 100 may be determined using sensors that are included in the CGR device 100, such as satellite positioning system sensors, image sensors, and motion sensors. The device location of the CGR device 100 may be determined and expressed in the manner described with respect to the device location information 442.

In operation 562, the request 440 is sent to the content sources 121 by the host application 120. The request 440 that is sent in operation 562 may be sent to many content sources at once, and these content sources may be, as examples, applications that are executed locally by the CGR device 100, or services that are executed remotely by different systems and are available using a communications channel such as a wired or wireless network.

In sending the request 440 in operation 562, the host application 120 provides information to the content sources 121. The information that is provided to the content sources 121 by the host application 120 may include the location (e.g., latitude and longitude coordinates) of the host device, as described with respect to the device location information 442. The information that is provided to the content source may include user preferences, as described with respect to the user preference information 444. As an example, the user preferences may be in the form of filters that can be utilized to include or exclude content having particular characteristics that are specified by the filters. The user preferences may include user information, such as age, preferred language, and/or other information that describes the user. User information may be used to obtain the content items 448, such as by selecting content based on languages spoken by the user or based on the age of the user. As one example, the content items 448 may include a poster that has text elements. Multiple versions of the poster may exist with text in different languages, and the user's preferred language can be used to select the appropriate version of the poster. As another example, the user's age can be used to select age-appropriate images.

Operation 563 includes obtaining content items 448 to be output for display by the host application 120 of the CGR device 100. The content items 448 may include coarse content location information and fine content location information. The content items 448 can be obtained by identifying the content items using a selection process, by transmission of the content items (or instructions to retrieve them) to the host application 120 by an external application or service, or in other ways. For example, operation 563 may include identifying a content item to be output for display by the CGR device 100 based on the device location of the CGR device 100 and coarse content location information that describes a location at which the content item is to be displayed in a CGR scene.

In one implementation, in response to the request 440 sent to the content sources 121 by the host application 120, one or more of the content sources 121 identifies content (e.g., content packages 446 that include content items 448) to be delivered to the host application 120. The content is identified based on the information supplied by the host application 120 such as the device location information 442 and the user preference information 444. The content may also be identified based on information that is already in the possession (e.g., stored by or accessible to) the content sources 121. For example, the device location information 442 may be utilized to construct an area, such as a geofence area, around the location of the CGR device 100, and only content items that are intended for display in this area will be returned.

In operation 563, the content items 448 may be identified based on information that is stored by the host application 120, and this information may be related to or may describe the user (e.g., the user preference information 444), the host device, and/or the host application. The content may also be identified based on information that is stored by the one of the content sources 121, and this information may be related to or may describe the user, the content source, or the content items that are made available by the content source.

In some implementations, identifying the content item to be output for display by the CGR device 100 is based on user preference information. In some implementations, identifying the content item to be output for display by the CGR device 100 device comprises transmitting requests to the content sources 121, the requests including the device location and the user preference information. Identifying the content item to be output for display by the electronic device may comprise determining that the content item is located in an area defined relative to the device location. Identifying the content item to be output for display by the electronic device may comprise ranking the content item based on the user preference information.

Operation 564 includes identifying an anchor in a physical environment based on the content items 448 using the CGR device 100.

In some implementations of the method, the anchor is a physical feature in the physical environment and identifying the anchor in the physical environment includes defining a three-dimensional representation of the physical environment using a sensor that is associated with the CGR device 100 and detecting presence of the physical feature in the three-dimensional representation of the physical environment. The three-dimensional representation of the physical environment may be a three-dimensional point cloud. The three-dimensional representation of the physical environment may be a three-dimensional mesh.

In some implementations of the method, the anchor is a physical feature in the physical environment and identifying the anchor in the physical environment includes obtaining one or more images of the physical environment using a camera that is associated with the CGR device 100 and detecting presence of the physical feature in the one or more images of the physical environment.

In some implementations of the method, the anchor is identified based on wireless signals that are received by the CGR device. The wireless signals may be received from a beacon, from wireless networking devices, or from any other source. The wireless signals can be used to define a location by triangulation. In some implementations of the method, the fine content location information that is associated with the content item identifies the anchor.

Operation 565 includes determining a content position and a content orientation for the content item relative to the anchor in the physical environment using fine content location information that is associated with the content item. Operation 566 includes displaying a representation of the content item using the CGR device 100 using the content position and the content orientation. For example, using a known position and orientation of the CGR device 100, the display system 111 of the CGR device 100 is used to output images of the content item 448 such that it appears to be positioned with respect to the physical environment or objects in the physical environment in the manner determined in operation 565. The user may then view and/or interact with the content item 448 using the CGR device 100. The displayed representation of the content item is a virtual object that is displayed to the user in the scene that is being viewed, in accordance with the description of the virtual object 330.

The process 560 can be used to identify many different types of content items and position those content items so that they are accurately displayed in a desired position and orientation with respect to the physical world to define a CGR scene.

As one example, content can be delivered within a geographic area identified by coarse content location information upon any suitable surface as described by the fine content location information. When the CGR device 100 is within a threshold distance from a location that is associated with a content item by coarse content location information, the CGR device 100 attempts to identify a surface (e.g., a planar surface) of sufficient size to render the content item. Once a suitable surface is identified, the content is output for display such that is appears to be located on the surface. As an example, the fine content location information could describe requirements for a suitable surface, such as a minimum size (e.g., height and width), a requirement that the surface be planar, a requirement that the surface be a horizontal surface, or a requirement that the surface be a vertical surface.

As another example, the content item can be localized relative to a three-dimensional scan of the physical environment so that the content item can be placed precisely with respect to the physical environment (e.g., a virtual tree may be positioned on a particular point on a physical table).

As another example localization can be established relative to a two-dimensional image. The two-dimensional image can be detected in an image obtained by a camera associated with the CGR device 100, and two-dimensional content or three-dimensional content may be rendered in a position in three-dimensional space that is offset from and defined relative to the detected two-dimensional image. Alternatively, content may be directly overlaid on the detected two-dimensional image rather than using an offset. As another alternative, a video may be overlaid over the detected two-dimensional image.

As another example, localization data may be a three-dimensional representation of a three-dimensional object. The content to be rendered is aligned in six degrees of freedom with respect to the detected object, e.g., to allow the physical appearance of a three-dimensional object to be changed. Additional content could be displayed around the overlaid three-dimensional image, e.g., to change the appearance of portions of the physical environment around the object.

Figure 6:
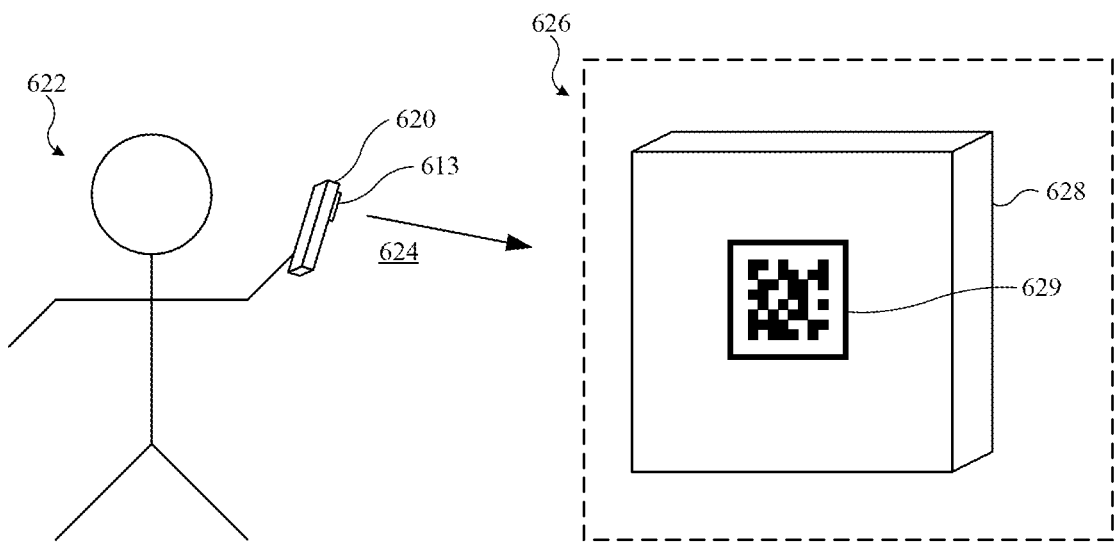
FIG. 6 is an illustration that shows a hand-held CGR device, a physical object, and a machine-readable data representation.
Figure 7:
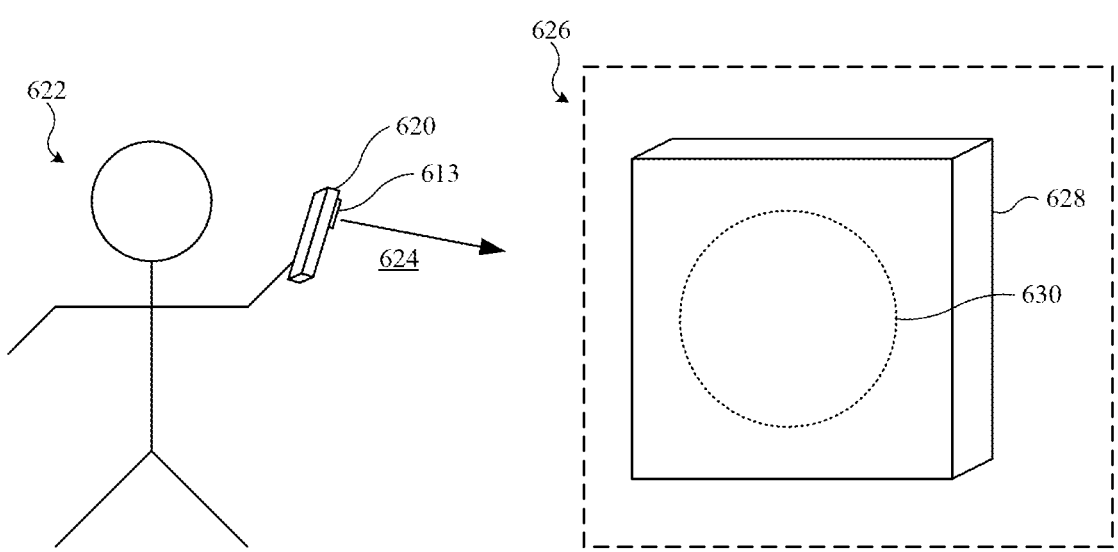
FIG. 7 is an illustration that shows the hand-held CGR device of FIG. 6, the physical object, and a virtual object.

FIG. 6 is an illustration that shows a handheld CGR device 620, a physical object 628, and a machine-readable data representation 629 that is located on the physical object 628. FIG. 7 is an illustration that shows the handheld CGR device 620, the physical object 628, and a virtual object 630 that is displayed with the physical object 628 in a CGR scene that is displayed by the handheld CGR device 620. As will be explained in detail, the handheld CGR device 620 obtains images that includes the machine-readable data representation 629 (FIG. 6), which is decoded and used to obtain a content item that corresponds to the virtual object 630, which is then placed in the CGR scene that is displayed to a user 622 of the handheld CGR device 620 (FIG. 7).

The handheld CGR device 620 is an implementation of the CGR device 100 and may include any or all of the components described with respect to the CGR device 100. In this example, the handheld CGR device 620 is an electronic device that has a form factor that allows it to be held by the user 622. As examples of form factors, the handheld CGR device 620 may be implemented in the form of a smart phone, a tablet computer, or a smart watch.

In the illustrated example, the user 622 is holding the handheld CGR device 620 such that a view direction 624 is oriented toward a physical environment 626, which in the illustrated environment includes the physical object 628. The physical object 628 has physical features, such as a surface and edges. The view direction 624 corresponds to the field of view of one or more cameras 613 that are included in the handheld CGR device 620.

The machine-readable data representation 629 includes a data value that identifies a content item that corresponds to the virtual object 630 and is intended to be displayed with the physical object 628 that the machine-readable data representation is located on. The data value is used to obtain the content item, for example, by using the data value to identify the content item in a request made to a server and/or service where the content item is stored. The position and pose of the machine-readable data representation may, in some implementations, be used to position the virtual object in the CGR scene that is displayed to the user 622.

The machine-readable data representation 629 is located on a surface of the physical object 628. The machine-readable data representation 629 is located on the physical object 628 so that the cameras 613 of the handheld CGR device 620 are able to obtain images that include the machine-readable data representation 629. The obtained images show the machine-readable data representation 629 in sufficient detail to allow the machine-readable data representation 629 to be perceived in the images and interpreted by the handheld CGR device 620. Interpreting the machine-readable data representation 629 includes identifying an encoded pattern in the obtained image and decoding the encoding pattern. Decoding is performed in accordance with an encoding and decoding scheme that is used to create the machine-readable data representation 629 from the data value (by encoding), and which allows retrieval of the data value from the machine-readable data representation 629 (by decoding).

The machine-readable data representation 629 is a visible indicia that can be perceived in images that are captured by the cameras 613 of the handheld CGR device. The machine-readable data representation 629 encodes information in a form that is readily interpreted by a computer, but is not readily interpreted by people. As examples, the machine-readable data representation 629 can be a visible representation of a data value formed in accordance with an encoding standard that allows the data value (e.g., an integer that includes only number characters, a string that includes only alphabetical characters, or a string that includes alphanumeric characters) to be encoded in the form of a pattern.

The encoded form of the machine-readable data representation 629 typically excludes a human-readable representation (e.g., using alphanumeric characters, logograms, or other human-interpretable writing systems) of the data value. In some implementations, a human readable representation of the data value may be located on the physical object 628, but it is not necessary for the human readable representation of the data value to be interpreted by the handheld CGR device 620 in order to determine the data value, as the data value may instead by obtained by interpretation of the machine-readable data representation 629.

The machine-readable data representation 629 may be encoded and presented in any suitable form that allows the machine-readable data representation 629 to be perceived by the handheld CGR device 620, and decoded by the handheld CGR device 620 in order to determine the data value. The data value may be an identifier that functions to identify a content item that is intended for display with the physical object 628 as part of the CGR scene, or the data value may include an identifier that functions to identify a content item that is intended for display with the physical object 628 as part of the CGR scene. As an example, the data value may be an alphanumeric identifier of any suitable length, such as a one hundred and twenty-eight bit alphanumeric identifier.

Examples of encoding methods that can be used as a basis for generating visual indicators that encode the data value and can be used as the machine-readable data representation 629 include one-dimensional barcodes and two-dimensional barcodes. As an example, in many well-known one-dimensional and two-dimensional barcode encoding standards, a one-dimensional or two-dimensional array of geometric areas are each either empty, or filled with a color. In such implementations, the machine-readable data representation 629 may be monochrome or may use various colors according to any current or subsequently-established encoding and decoding scheme.

The handheld CGR device 620 may be configured to determine a position and pose for the machine-readable data representation 629 with respect to the physical environment 626. The position and pose for the machine-readable data representation 629 may be determined by the handheld CGR device 620 using machine vision techniques. As an example, the machine-readable data representation 629 may include alignment features having known geometric characteristics (e.g., shape, size, distance by which pairs of alignment features are spaced, etc.). Using machine vision techniques, these geometric characteristics of the alignment features can be used as a basis for determining the distance of the machine-readable data representation 629 from the handheld CGR device 620 and for determining the angular orientation of the machine-readable data representation 629 relative to the handheld CGR device 620.

The position and pose of the machine-readable data representation 629 include a position value that represents the location of the machine-readable data representation 629 within the physical environment 626. As an example, the position value may be a translation value that is expressed in three linear degrees of freedom. The position value may be expressed as a relative value that represents a distance between the machine-readable data representation 629 and a fixed location, such as the location of a feature in the physical environment 626, as a relative value that represents a distance between the machine-readable data representation 629 and a moving location, such as the location of the handheld CGR device 620, or as an absolute position value (e.g., geospatial coordinates such as latitude, longitude, and elevation).

The position and pose of the machine-readable data representation 629 include a pose value that represents the angular orientation of the machine-readable data representation 629 within the physical environment 626. As an example, the pose value may be a rotation value that is expressed in three rotational degrees of freedom (e.g., pitch, roll, and yaw). The pose value may be expressed in a suitable reference frame such as in the form of values that represent the angular orientation of the machine-readable data representation 629 relative to a fixed reference orientation, or in the form of values that represent the angular orientation of the machine-readable data representation 629 relative to a moving reference orientation, such as an angular orientation of the handheld CGR device 620.

The handheld CGR device 620 displays a virtual object 630 to the user such that the virtual object 630 is positioned at a particular location and orientation within the physical environment 626, such as at a particular location and orientation referenced relative to the physical object 628. The virtual object 630 may obscure part of or all of the physical object 628 in the CGR scene that is displayed by the handheld CGR device 620.

The virtual object 630 is a representation of a content item that is displayed in the scene that is viewed by the user. The virtual object 630 may be, as examples, a three-dimensional object or a two-dimensional object (e.g., an image or text). The virtual object 630 may be a static virtual object, such as a virtual statue, or may be a dynamic virtual object, such as a virtual animated character. In some implementations, the user may interact with the virtual object 630, in accordance with to computer program instructions that are included in the content item and control the behavior of the virtual object 630.

The scenario shown in FIGS. 6-7 may be implemented using a head-mounted CGR device. The head-mounted CGR device obtains images that includes the machine-readable data representation, which is decoded and used to obtain a content item that corresponds to the virtual object, which is then placed in the CGR scene that is displayed to a user of the head-mounted CGR device.

The head-mounted CGR device, which may also be referred to as a head-mounted display, is an implementation of the CGR device 100 and may include any or all of the components described with respect to the CGR device 100. In this example, the head-mounted CGR device is an electronic device that has a form factor that allows it to be worn on the head of a user. The head-mounted CGR device may utilize known configurations and may be implemented in the form of a video pass-through CGR device or may be implemented in the form of an optical pass-through CGR device. The user controls the orientation of a view direction of the head-mounted CGR device by the position and angular orientation of their head, and optionally based on the gaze angle of their eyes, in implementations in which the head-mounted CGR device has eye-tracking capabilities.

In the illustrated example, the head-mounted CGR device is oriented such that the view direction is oriented toward a physical environment that includes a physical object, as described with respect to the physical environment 626 and the physical object 628. One or more cameras that are included in the head-mounted CGR device are used to obtain images that include the machine-readable data representation. The machine-readable data representation is decoded to determine the data value that identifies the content item that corresponds to the virtual object and to obtain the content item, as described with respect to the machine-readable data representation. The head-mounted CGR device displays the virtual object to the user such that the virtual object is positioned at a particular location and orientation within the physical environment, such as at a particular location and orientation referenced relative to the physical object, as explained with respect to the virtual object 630.

Figure 8:
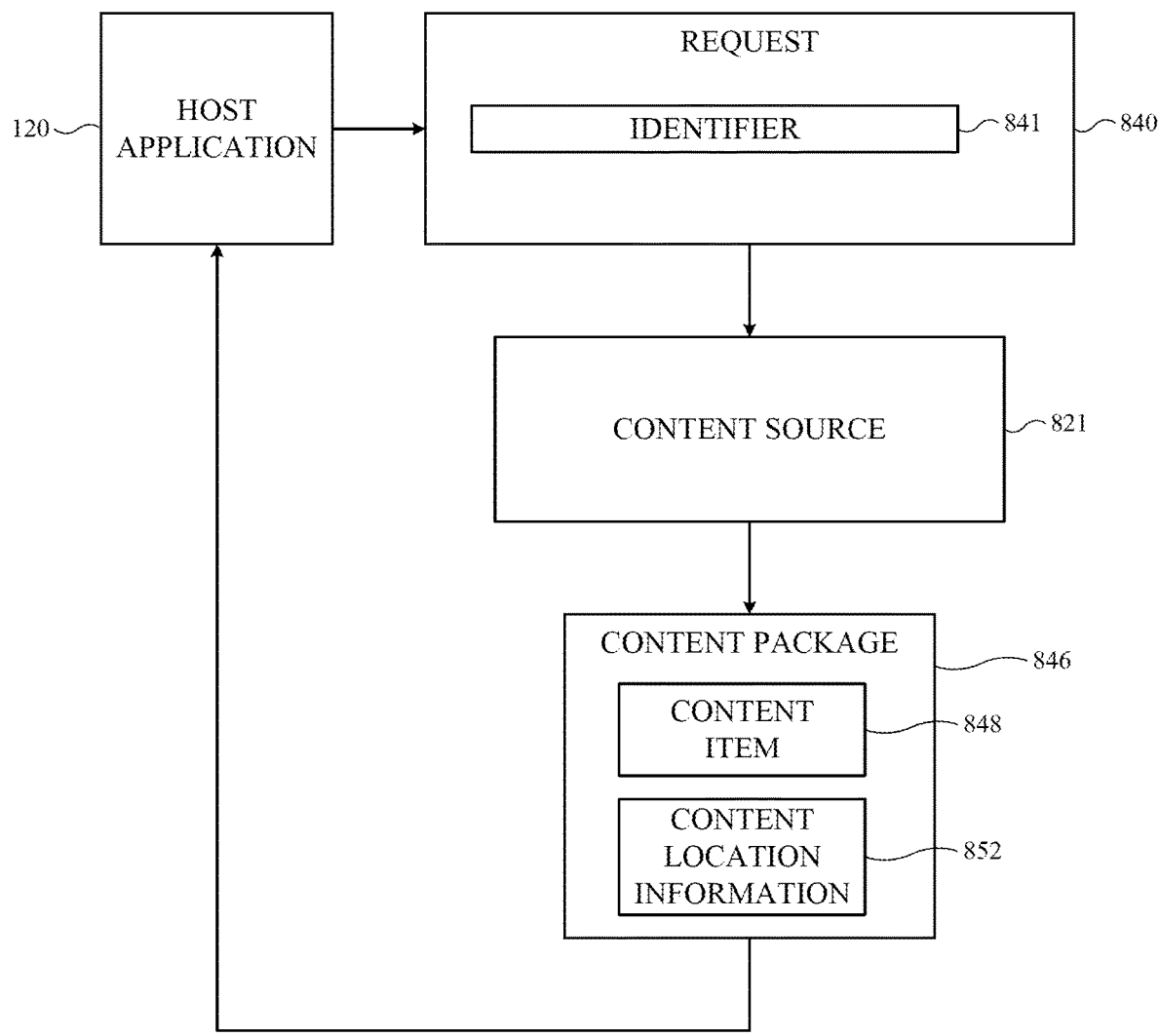
FIG. 8 is a block diagram that shows an example of a relationship between a host application and a content provider according to a second implementation.

FIG. 8 is a block diagram that shows an example of a relationship between the host application 120 and a content source 121 according to a second implementation. The host application 120 determines a data value by decoding a machine-readable data representation that is associated with a physical object, as explained with respect to the machine-readable data representation 629 and the machine-readable data representation. The data value includes a content identifier 841. The content identifier 841 is any information, decoded from the machine-readable data representation as part of the data value, that identifies a content item that can be displayed in a CGR scene by the host application 120. The data value may also include other information, such as a content source identifier. The content source identifier is any information, decoded from the machine-readable data representation as part of the data value, that identifies a specific content source from which the content item can be obtained by the host application. As examples, the content source identifier may include information that identifies an application or service, either local or remote, using an identifier code, a name, a complete uniform resource locator (URL), a partial URL (e.g., a domain name or a path), or other identifying information.

The host application 120 sends a request 840 to the content source 821, which is one of the content sources 121 and may be implemented and configured in a manner that is consistent with the description of the content sources 121. As one example, the host application 120 may be configured to use the content source 821 for all requests. As another example, the content source 821 may be selected by the host application based on information that is included in the data value, such as the content source identifier, as previously discussed. The selected content source 821 may be a single content source that is used by the host application for all content items.

The request 840 from the host application 120 includes the content identifier 841. The content source 821 uses the content identifier 841 to identify the content item 848. As an example, the content identifier 841 may be a unique identifier value that is associated with the content item. Conventional methods can be used by the content source 821 to identify the content item 848 using the content identifier 841. As one example, the content identifier may be a filename, object name, or other name that allows the content item 848 to be directly accessed by the content source 821. As another example, a database lookup function can be used to identify the content item 848 using the content identifier 841, using information in a database that is maintained by or accessible to the content source 821 and includes information that describes relationships between content identifiers and content items. As another example, the content identifier may be a complete URL or a partial URL (e.g., a domain name or a path).

The content source 821 may be a local content source (e.g., in the form of an application that are executed by the CGR device 100, in which case the request 840 may be made in the form of a local API call). The content source 821 may be a remote content sources that is not located on the CGR device 100 (e.g., content sources implemented by remote services that are accessible using a communications network such as the Internet), in which case the request 840 may be transmitted to the remote content sources using any suitable means of communication.

When the content source 821 locates the content item 848, the content item 848 is provided to the host application 120 by the content source 821. The content source 821 may optionally provide additional information to the host application along with the content item 848. The content source 821 may provide the content item 848 to the host application in any suitable manner, such as by transmitting the content item 848 to the host application 120 in implementations where the content source 821 is remote, or by providing a pointer to a file location in implementations where the content source 821 is local.

The content item 848 may be provided to the host application 120 as part of a content package 846, which is a group of assets that includes the content item 848 and other related information, such as metadata. In the illustrated example, the content package 846 includes the content item and content location information 852.

The content item 848 includes static and interactive content that will be output for display to the user and/or available for interaction (e.g., by performing an action in response to a user action). The content item 848 may include, as example, three-dimensional models, images, videos, audio, executable code that affects behavior of the content item 848 to allow interactivity, a rendering framework for facilitating rendering and display of the content item 848, and/or metadata that describes aspects of the other components that are included in the content item 448.

The content location information 852 includes information that allows the CGR device 100 to place the content item 848 in the CGR scene. The content location information 852 allows the content item 848 to be output for display to the user in dependence on the current position and orientation of the CGR device 100 such that the content item 848 is placed with a high degree of accuracy and precision relative to the physical environment and physical objects in the physical environment. As one example, the content location information 852 may identify or define an anchor, and the CGR device 100 can use this information to match the anchor that is identified by the content location information 852 to a location in the physical environment. In some implementations, a single anchor is used to locate the content item 848 with respect to the physical environment. In other implementations, multiple anchors are used to locate the content item 848 with respect to the physical environment.

The anchor may be a feature in the physical environment that is discernable by the CGR device 100. As examples, the anchor may be an edge, corner, outline, or contour of a physical object. As one example, the edge, corner, outline, or contour of the physical object may be discerned by using machine vision techniques to analyze visible spectrum images that are captured by cameras that are included in or associated with the CGR device 100. As one example, the feature may be defined by information that allows the feature to be identified in a two-dimensional image. As another example, the feature may be defined by information that allows the feature to be identified in a three-dimensional mesh or point cloud. For example, the edge, corner, outline, or contour of the physical object may be discerned by analyzing three-dimensional geometric data (e.g., point clouds) that represent surfaces of the physical object. The three-dimensional geometric data may be captured using sensor that are associated with the CGR device 100, such as structured light sensors, depth cameras, or LIDAR sensors.

As one example, the content item 848 may include a three-dimensional model that includes features that correspond to the shape, size, and/or geometric configuration of a physical object, such as the physical object 628 of FIGS. 6-7. In such an implementation, the CGR device 100 may analyze the physical object, for example, using the sensors 112 and/or the cameras 113, to identify the shape, size, and/or geometric configuration of all or part of the physical object. The host application may determine a size, position, and pose that are used to place the content item 848 in the CGR scene by matching the three-dimensional configuration of the three-dimensional model to the determined three-dimensional configuration of the physical object. This allows the content item 848 to be displayed in the CGR scene as a virtual object (e.g., according to the description of the virtual object 630 of FIGS. 6-7 that, from the perspective of the user, replaces the physical object.

By replacing the physical object (or part of the physical object) in the CGR scene with a virtual object, the content item 848 may allow the user to view and/or interact with virtual content that is relevant to the physical object, such as instructions for the physical object or a demonstration of the physical object. For example, in a CGR scene where the physical object is a machine with physical controls (e.g., buttons, levers, etc.) the virtual object could highlight controls and show how to use them as part of a multi-part tutorial that leads the user through the steps of a process as the user manipulates the controls of the machine.

As one example, images obtained by the cameras 113 of the CGR device may be analyzed using a machine vision algorithm that is configured to determine the position and pose of the physical object. A machine vision algorithm may, for example, use a trained machine learning model that has been trained to determine the position and pose of the physical object. As another example, the shape, size, and/or geometric configuration of the physical object can be determined by processing multiple two-dimensional images that are obtained by the cameras 113 to generate three-dimensional data (e.g., a three-dimensional point cloud or a three-dimensional model) that represents the physical object, using photogrammetry techniques or other methods. As another example the sensors 112 of the CGR device 100 may include three-dimensional sensors, such as a depth camera, a structured light sensor, an imaging radar device, and/or a LIDAR device, that are operable to output three-dimensional data (e.g., a three-dimensional point cloud or a three-dimensional model) that represents the physical object.

The anchor may be a wireless positioning signal. A wireless positioning signal may be implemented using radio frequency communication technologies and may be implemented using signal triangulation techniques. Devices such as radio frequency beacons and wireless networking signals may be used as signal sources for triangulation.

The content location information 852 may indicate an anchor by which the content item 848 can connect to a physical object to define the CGR scene. The anchor may define a specific positional correspondence between the content item 848 and the physical object. As an example, the anchor may position content onto the surface of a machine in order to provide instructions to a user or to provide a virtual control interface that allows interactions with the CGR scene to control operation of the physical object.

Using the content location information 852, the host application 120 may determine that the content item 848 should be displayed within the current field of view of the CGR device 100. For example, the host application may determine that the content location information 852 corresponds to a location that is within the current field of view of the CGR device 100. The host application 120 attempts to place the content item 848 with respect to the physical object using the content location information 852. Upon determining the position of the content item 848 with respect to the physical object to within a desired degree of accuracy, the host application 120 may cause the content item 848 to be output for display to the user and may implement interactivity or other functions according to computer interpretable program instructions that are included in the content package 846.

Figure 9:
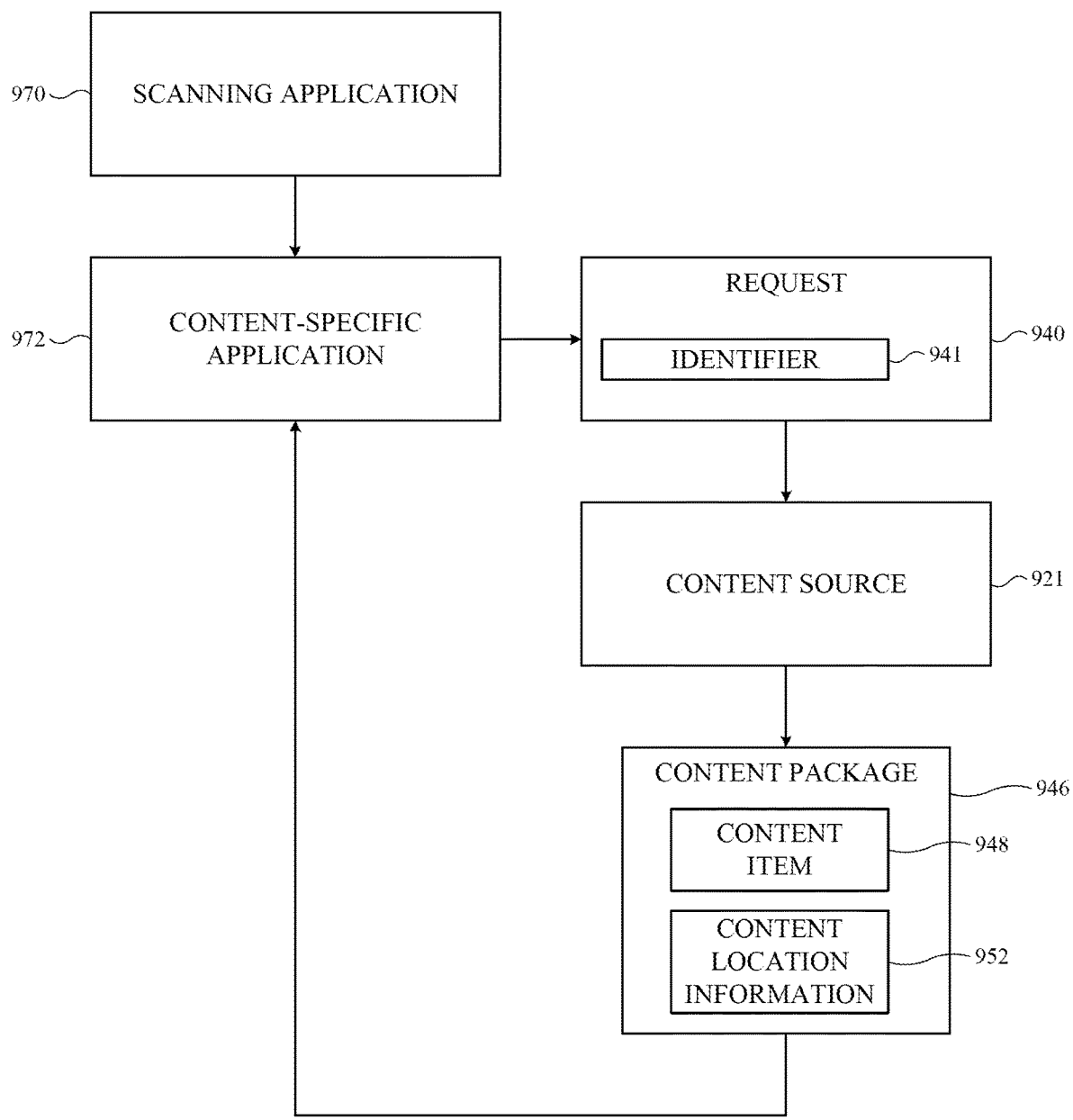
FIG. 9 is a block diagram that shows an example of a relationship between a scanning application, a content-specific application, and a content provider according to a third implementation.

FIG. 9 is a block diagram that shows an example of a relationship between a scanning application 970, a content-specific application 972, and a content source 921 according to a third implementation. The scanning application 970 and the content-specific application 972 are each configured to perform some or all of the functions that were previously described with respect to the host application 120, and the description of the host application is applicable to each of them. In the illustrated example, the scanning application 970 is configured to obtain images of and decode a machine-readable data representation, and the content-specific application is configured to use a data value decoded by the scanning application 970 to obtain and display content in a CGR scene.

The scanning application 970 determines the data value by decoding a machine-readable data representation that is associated with a physical object, as explained with respect to the machine-readable data representation 629. The data value includes a content identifier 941, which is implemented and functions according to the description of the content identifier 841. The data value may also include an application identifier that identifies a specific application that is responsible for obtaining the content that is identified by the content identifier 841 and displaying that content as part of a CGR scene.

The application identifier is used by the scanning application 970 to select an application for use in obtaining and displaying the content. In the illustrated example, the content-specific application 972 is an example of an application that has been selected by the scanning application 970 using the application identifier that was decoded from the machine-readable data representation. As examples, the application identifier may include information that identifies an application or service, either local or remote, using an identifier code, a name, a complete uniform resource locator (URL), a partial URL (e.g., a domain name or a path), or other identifying information.

The host application 120 sends a request 940 to the content source 921, which is one of the content sources 121 and may be implemented and configured in a manner that is consistent with the description of the content sources 121. In this implementation, the content source 921 may be a local content source, a remote content source that is accessible over a network, or may be a part of the content-specific application 972.

The request 940 from the host application 120 includes the content identifier 941. The content source 921 uses the content identifier 941 to identify the content item 948 as previously described with respect to the content source 821 and the content identifier 841.

The content source is implemented and functions in the manner described with respect to the content source 821. The content source 921 may be a local content source (e.g., in the form of an application that are executed by the CGR device 100, in which case the request 940 may be made in the form of a local API call). The content source 921 may be a remote content sources that is not located on the CGR device 100 (e.g., content sources implemented by remote services that are accessible using a communications network such as the Internet), in which case the request 940 may be transmitted to the remote content sources using any suitable means of communication.

The content item 948 may be provided to the host application 120 as part of a content package 946, which is a group of assets that includes the content item 948 and other related information, such as metadata. In the illustrated example, the content package 946 includes the content item and content location information 952. The content package 946, the content item 948, and the content location information 952 are implemented and function in the manner described with respect to the content package 846, the content item 848, and the content location information 852, and are used by the content-specific application 972 to place a virtual object corresponding to the content item 948 in the CGR scene in the manner previously described with respect to the host application 120.

Figure 10:
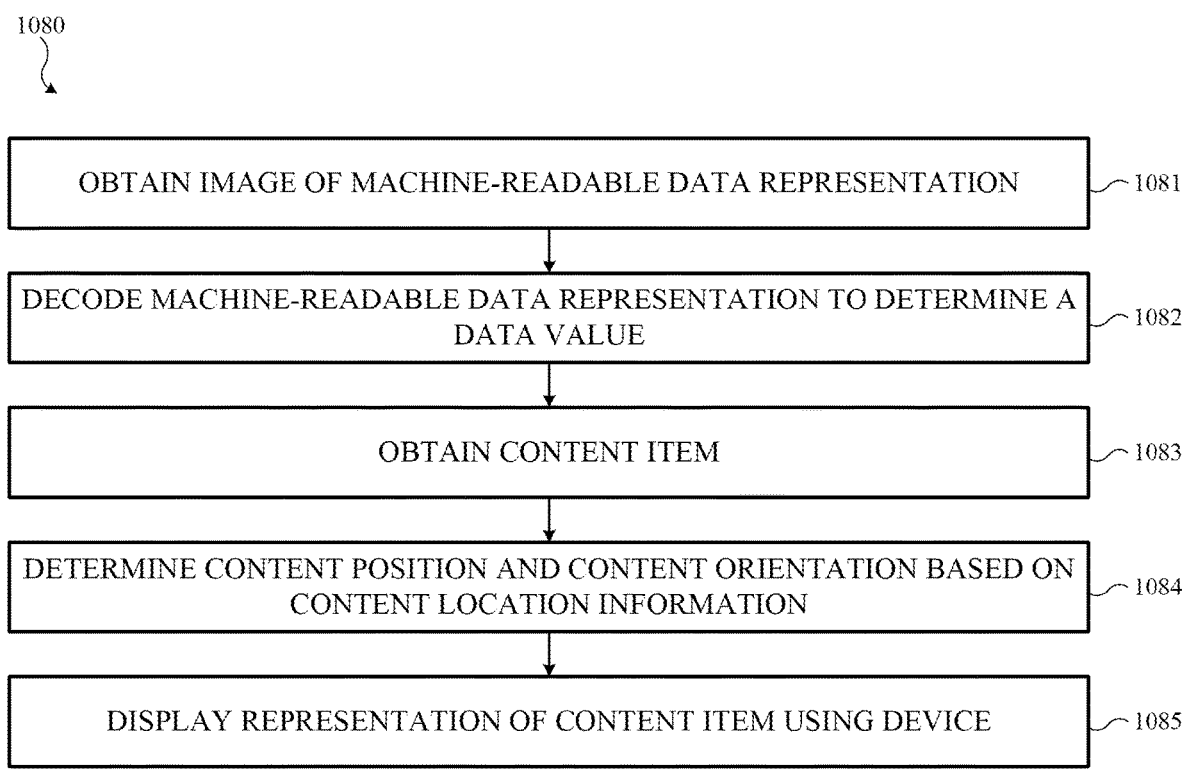
FIG. 10 is a flowchart that shows a process for content identification and placement according to the second implementation.

FIG. 10 is a flowchart that shows a process 1080 for content identification and placement. The process 1080 allows a host device to access content from multiple content sources using a host application. Portions of the process 1080 can be implemented as computer program instructions, such as the host application 120, the scanning application 970, and/or the content-specific application 972, and these computer program instructions can be executed by a processor, such as the processor 114 of the CGR device 100. The process 1080 will be described with reference to the CGR device 100, the host application 120, the scanning application 970, the content-specific application 972, the content source 821, and the content source 921, but can be used with other devices, applications, and content sources. The process 1080 may be implemented using a handheld device, such as the handheld CGR device 620, a head-mounted device, or a device having a different form factor.

As one example, the process 1080 can be implemented in the form of a system that includes a memory and a processor that is configured to execute instructions stored in the memory, where the instructions correspond to the process 1080. As another example, the process 1080 can be implemented in the form of a non-transitory computer-readable storage device including program instructions executable by one or more processors. The program instructions correspond to the process 1080 and, when executed, cause the one or more processors to perform operations of the process 1080.

Operation 1081 includes obtaining an image of a machine-readable data representation using a camera of an electronic device, wherein the machine-readable data representation is located on a physical object. Operation 1081 and subsequent operations of the process 1080 may be performed using the CGR device 100 and implementations thereof, such as the handheld CGR device 620 and the head-mounted CGR device. As an example, the image of the machine-readable data representation may be obtained by capturing a still image or a video frame is raster form using the cameras 613 of the handheld CGR device 620.

The machine-readable data representation that is visible in the image that is obtained in operation 1081 may be implemented in accordance with the description of the machine-readable data representation 629. As examples, the machine-readable data representation may be a one-dimensional barcode or a two-dimensional barcode.

As examples, Operation 1081 may be performed using the host application 120 as described with respect to FIG. 8 or with the scanning application 970 as described with respect to FIG. 9.

Operation 1082 includes decoding the machine-readable data representation to determine a data value that includes a content identifier. Decoding may be performed using known techniques and standards for encoding and decoding machine-readable data representations, as described with respect to encoding and decoding the machine-readable data representation 629.

Operation 1083 includes obtaining a content item to be output for display by the electronic device based on the content identifier, wherein content location information is associated with the content item.

In some implementations of the method, obtaining the content item to be output for display by the electronic device in operation 1083 includes transmitting a request to a content source. As an example, the data value includes a content source identifier that identifies the content source so that the request can be sent to a content source that is selected from among multiple possible content sources using the content source identifier.

As examples, the content item that is obtained in operation 1083 may include a three-dimensional model, an image, a video, audio, executable code, a rendering framework, metadata, or two or more of these and/or other types of content items.

In operation 1083, the request is sent to a content source as described with respect to the request 840 and the content source 821 of FIG. 8 or as described with respect to the request 940 and the content source 921. As examples, the request may be sent to a remote content source, a local content source, or to an internal content source as described with respect to the content-specific application 972 of FIG. 9.

In sending the request in operation 1083, the host application information is provided to the content source that allows for identification of the content item. This information may be of the type described with respect to the content identifier 841 of FIG. 8 or the content identifier 941 of FIG. 9.

Operation 1084 includes determining a content position and a content orientation for the content item relative to the physical object based on the content location information. Operation 1084 may be implemented in accordance with the description made of the host application 120 in connection with FIG. 8 or in accordance with the description made of the content-specific application 972 in connection with FIG. 9.

In some implementations of the process 1080, operation 1084 includes determining a geometric configuration of the physical object using the electronic device. In such implementations, determining the content position and the content orientation for the content item relative to the physical object is further based on the geometric configuration of the physical object.

As one example, the geometric configuration of the physical object can be determined by analyzing an image of the physical object that is obtained using the camera of the electronic device. As another example, the geometric configuration of the physical object can be determined by analyzing a three-dimensional sensor output that is obtained using a three-dimensional sensor of the electronic device and represents the physical object.

In some implementations of the process 1080, the content item that is obtained in operation 1083 includes a three-dimensional model. In such implementations, determining the content position and the content orientation for the content item relative to the physical object in operation 1084 may be further based on matching the three-dimensional model to the geometric configuration of the physical object. This allows the three-dimensional model of the content item to be displayed in the CGR scene relative to the physical object so that the shape, size, and geometric configuration of the virtual object correspond to the shape, size, and geometric configuration of the physical object.

As one example, the geometric configuration of the physical object may be represented by a three-dimensional point cloud of the physical object. As another example, the geometric configuration of the physical object is represented by a three-dimensional mesh of the physical object.

In some implementations of the process 1080, determining a content position and a content orientation for the content item relative to the physical object based on the content location information in operation 1084 includes identifying a feature in a two-dimensional image and determining the content position and the content orientation relative to the feature. In some implementations of the method, the determining a content position and a content orientation for the content item relative to the physical object based on the content location information includes identifying a feature in a three-dimensional mesh and determining the content position and the content orientation relative to the feature.

The process 1080 may include determining a data representation position and data representation pose for the machine-readable data representation. This may be performed in the manner previously described with respect to the machine-readable data representation 629. As an example, the data representation position and the data representation pose may be determined using images of the machine-readable data representation that were obtained in operation 1081. Using the data representation position and the data representation pose, the content position and the content orientation for the content item relative to the physical object can be determined by matching the position and pose of the content item (e.g., a three-dimensional model included in the content item) using a reference position and pose for the machine-readable data representation that describes the location and orientation of a portion of the content item relative to the machine-readable data representation.

Operation 1085 includes displaying a representation of the content item using the electronic device according to the content position and the content orientation that were determined in operation 1084. As previously described with respect to the host application 120 and the content-specific application 972, the content item is displayed with respect to the physical environment and one or more physical objects in the physical environment according to a spatial correspondence described by the content position and the content orientation so that the content item appears to be a part of the physical environment and/or appears to take the place of a physical object that is present in the physical environment. When displayed as part of the CGR scene, the content item may take the form of a virtual object that appears to be positioned with respect to the physical environment or objects in the physical environment. The user may then view and/or interact with the content item using a CGR device, such as the CGR device 100, the handheld CGR device 620, or the head-mounted CGR device. The virtual object is displayed to the user in the scene that is being viewed and may be interacted with, in accordance with the description of the virtual object 630.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify virtual content and place the virtual content with respect to a physical environment. Accordingly, use of such personal information data enables users to view and interact with a wide variety of content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in identifying content. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, identifying virtual content to be displayed in a physical environment be performed based on non-personal information data or a bare minimum amount of personal information, other non-personal information available to the devices, or publicly available information.

What is claimed is:

1. A method, comprising:
   obtaining an image of a machine-readable data representation that is located on a physical object using a camera of an electronic device, wherein the machine-readable data representation includes an encoded form of a data value;
   decoding the machine-readable data representation to determine the data value, wherein the data value includes a content identifier and a content source identifier;
   selecting a content source based on the content source identifier;
   obtaining a content item and content location information based on the content identifier from the content source;
   determining a content position and a content orientation for the content item relative to the physical object based on the content location information; and
   displaying a representation of the content item using the electronic device according to the content position and the content orientation.

2. The method of claim 1, wherein obtaining the content item and the content location information comprises transmitting a request to the content source, and the request includes the content identifier.

3. The method of claim 1, wherein the content source identifier includes information that identifies an application or service which includes the content item, and the content item and the content location information are transmitted by the content source to obtain the content item and the content location information.

4. The method of claim 1, further comprising:
determining a geometric configuration of the physical object using the electronic device,
wherein the content item includes a three-dimensional model of the content item and determining the content position and the content orientation for the content item relative to the physical object is further based on matching the three-dimensional model to the geometric configuration of the physical object.

5. The method of claim 1, further comprising:
determining that the content location information corresponds to a location that is within a field of view of the camera of the electronic device, wherein displaying the content item is based on the content location information corresponding to the location that is within the field of view of the camera.

6. The method of claim 1, wherein selecting the content source comprises selecting the content source from among multiple content sources using the content source identifier.

7. The method of claim 1, wherein the content location information defines an anchor that corresponds to a physical feature in a physical environment that contains the physical object, and determining the content position and the content orientation for the content item is relative to the anchor.

8. A system, comprising:
a memory;
a processor configured to execute instructions stored in the memory to:
obtain an image of a machine-readable data representation that is located on a physical object using a camera of an electronic device, wherein the machine-readable data representation includes an encoded form of a data value;
decode the machine-readable data representation to determine the data value, wherein the data value includes a content identifier and a content source identifier;
select a content source based on the content source identifier;
obtain a content item and content location information based on the content identifier from the content source;
determine a content position and a content orientation for the content item relative to the physical object based on the content location information; and
display a representation of the content item in a physical environment using the electronic device according to the content position and the content orientation.

9. The system of claim 8, wherein the processor is further configured to execute instructions stored in the memory to obtain the content item and the content location information by transmitting a request to the content source, and the request includes the content identifier.

10. The system of claim 8, wherein:
the content source identifier includes information that identifies an application or service which includes the content item, and
the processor is further configured to execute instructions stored in the memory to the content item and the content location information by the content source to obtain the content item and the content location information.

11. The system of claim 8, wherein:
the content item includes a three-dimensional model of the content item and the processor is further configured to execute instructions stored in the memory to:
determine a geometric configuration of the physical object using the electronic device, and
determine the content position and the content orientation for the content item relative to the physical object is based on matching the three-dimensional model to the geometric configuration of the physical object.

12. The system of claim 8, wherein the processor is further configured to execute instructions stored in the memory to:
determine that the content location information corresponds to a location that is within a field of view of the camera of the electronic device, and
display the content item based on the content location information corresponding to the location that is within the field of view of the camera.

13. The system of claim 8, wherein the processor is further configured to execute instructions stored in the memory to select the content source from among multiple content sources using the content source identifier.

14. The system of claim 8, wherein:
the content location information defines an anchor that corresponds to a physical feature in a physical environment that contains the physical object, and
the processor is further configured to execute instructions stored in the memory to determine the content position and the content orientation for the content item relative to the anchor.

15. A non-transitory computer-readable storage device that includes program instructions executable by one or more processors that, when executed, cause the one or more processors to perform operations, the operations comprising:
obtaining an image of a machine-readable data representation that is located on a physical object using a camera of an electronic device, wherein the machine-readable data representation includes an encoded form of a data value;
decoding the machine-readable data representation to determine the data value, wherein the data value includes a content identifier and a content source identifier;
selecting a content source based on the content source identifier;
obtaining a content item and content location information based on the content identifier from the content source;
determining a content position and a content orientation for the content item relative to the physical object based on the content location information; and
displaying a representation of the content item in a physical environment using the electronic device according to the content position and the content orientation.

16. The non-transitory computer-readable storage device of claim 15, wherein obtaining the content item and the content location information comprises transmitting a request to the content source, and the request includes the content identifier.

17. The non-transitory computer-readable storage device of claim 15, wherein the content source identifier includes information that identifies an application or service which includes the content item, and the content item and the content location information are transmitted by the content source to obtain the content item and the content location information.

18. The non-transitory computer-readable storage device of claim 15, wherein the operations further comprise:
    determining a geometric configuration of the physical object using the electronic device,
    wherein the content item includes a three-dimensional model of the content item and determining the content position and the content orientation for the content item relative to the physical object is further based on matching the three-dimensional model to the geometric configuration of the physical object.

19. The non-transitory computer-readable storage device of claim 15, wherein the operations further comprise:
    determining that the content location information corresponds to a location that is within a field of view of the camera of the electronic device, wherein displaying the content item is based on the content location information corresponding to the location that is within the field of view of the camera.

20. The non-transitory computer-readable storage device of claim 15, wherein selecting the content source comprises selecting the content source from among multiple content sources using the content source identifier.

21. The non-transitory computer-readable storage device of claim 15, wherein the content location information defines an anchor that corresponds to a physical feature in a physical environment that contains the physical object, and determining the content position and the content orientation for the content item is relative to the anchor.

* * * * *